US007310884B2

(12) United States Patent
Fleischer

(10) Patent No.: US 7,310,884 B2
(45) Date of Patent: Dec. 25, 2007

(54) ADJUSTABLE GOLDEN SECTION INDICATOR AND METHOD FOR LOCI TRANSFER

(76) Inventor: Charles Fleischer, 5346 Woodman Ave., Sherman Oaks, CA (US) 91401

( * ) Notice: Subject to any disclaimer, the term of this patent is extended or adjusted under 35 U.S.C. 154(b) by 0 days.

(21) Appl. No.: 11/415,616

(22) Filed: May 1, 2006

(65) Prior Publication Data

US 2007/0011890 A1 Jan. 18, 2007

Related U.S. Application Data

(60) Provisional application No. 60/677,184, filed on May 2, 2005.

(51) Int. Cl.
*B43L 7/10* (2006.01)
*A41H 1/02* (2006.01)
*G01B 3/02* (2006.01)

(52) U.S. Cl. .................... 33/1 K; 33/1 BB; 33/558.02; 33/455

(58) Field of Classification Search .................. 33/1 K, 33/1 F, 1 BB, 23.01, 23.07, 23.08, 23.09, 33/432, 558.01, 558.02, 455
See application file for complete search history.

(56) References Cited

U.S. PATENT DOCUMENTS

| | | | | |
|---|---|---|---|---|
| 834,470 A * | 10/1906 | Hanssen | ..................... | 33/25.1 |
| 1,622,229 A * | 3/1927 | Ormiston | ..................... | 33/1 K |
| 2,645,853 A * | 7/1953 | Kaufman | ................... | 33/23.07 |
| 2,780,004 A * | 2/1957 | Rosenbaum | ................. | 33/512 |
| 3,226,835 A * | 1/1966 | Kidjel | ..................... | 33/558.02 |
| 4,823,476 A * | 4/1989 | Curtin | ......................... | 33/512 |
| 5,174,037 A * | 12/1992 | Curtin | ......................... | 33/512 |
| 5,473,821 A * | 12/1995 | DiMarco | ..................... | 33/456 |
| 6,339,834 B1 * | 1/2002 | Crozier et al. | .............. | 714/701 |

* cited by examiner

*Primary Examiner*—Christopher W Fulton

(57) ABSTRACT

An adjustable device to locate and transfer the positions of golden section points from a source image to a secondary surface, comprising a plurality of paired blades that are coupled to pivot at the golden section points that occur along the length of the blades and at the endpoints of the blades. This configuration creates a looped series of connected levers, sequenced to diminish in length by golden section ratio, with fulcrums positioned at golden section points. The device is bilaterally symmetrical and maintains consistent golden section proportions regardless of the size to which it is adjusted. The creation of accurate images by a means other than tracing enables the user to learn how the mathematics of the golden section relates to the principles of proportion that connect the parts to the whole.

11 Claims, 21 Drawing Sheets

ADJUSTABLE GOLDEN SECTION INDICATOR AND METHOD FOR LOCI TRANSFER

CROSS-REFERENCE TO RELATED APPLICATIONS

This application claims the benefit of provisional patent application Ser. No. 60/677,184 filled 2005 May 2 by the present inventor.

FEDERRALLY SPONSORED RESEARCH

None

SEQUENCE LISTING

None

Field of Invention

This invention relates to a novel device that provides artists and designers with a means to create works that accurately articulate the dynamics of proportion found in nature.

BACKGROUND OF THE INVENTION

There have been numerous attempts to provide a coherent system to allow for an improved way to accurately render the human body. A method for measuring the physical attributes of the human body proposed by Leonardo DaVinci is referenced by Curtin, U.S. Pat. No. 4,823,476, Apr. 25 1989. Curtin provides a static transparent panel that divides the body into predetermined segments. The invention fails to provide an adjustable means of measuring and transferring the details of proportion that are intrinsic to the golden section.

U.S. Pat. No. 5,174,037, Dec. 29, 1992, Curtin provides a similar method for measuring the human head. This is also a static grid that fails to disclose the golden section.

U.S. Pat. No. 1,280,094, Sep. 24, 1918, Smith describes a method for rendering the human body and head by presenting a grid divided into various-sized diamond shapes. The invention is static and there is no disclosure of the golden section.

U.S. Pat. No. 2,780,004, Mar. 25, 1954, Rosenbaum describes a method for measuring the human head in relation to providing eyeglasses. The device comprises a frame with movable blades that can be aligned to specific features of individual faces. The device is limited to the face and presents no understanding of the golden section.

U.S. Pat. No. 1,462,850, Jul. 24, 1923, Clark describes a profile-defining apparatus. This device provides a series of adjustable components that feature a number of various geometrical possibilities that can be combined to create assorted profiles. There is no disclosure of the golden section.

U.S. Pat. No. 364,043, May 31, 1887, Riche describes an improved pantograph. Riche's device allows for an image to be reduced or enlarged in a manner that can also flip the image on its X axis. The 4 bars of his invention must be attached to a guide track. They are coupled at predetermined points that ignore the principles of the golden section.

U.S. Pat. No. 4,397,090, Aug. 9, 1983, Nicyper describes an improved pantograph that allows for the image being copied to be re-proportioned and/or reversed. To manifest this feature, the 4 bars of his device can be coupled at points that are adjustable. The guide track is also adjustable. Nicyper does not disclose the use of the golden section.

U.S. Pat. No. 834,470, Oct. 30, 1906, Hanssen describes an improved pantograph comprising a triangular frame from which a series of intermediate arms are attached in two sets of equal numbers. The value of each subsequent endpoint increases in intervals of 400. There is no mention of the golden section.

U.S. Pat. No. 3,562,919, Aug. 29, 1968, Green describes a device comprising four arms of a movable parallelogram with one comer attached to a fixed blade featuring a protractor and the opposite comer being confined to move along a straight edge. The device is utilized as a layout tool for a machine shop. There is no relationship to the golden section disclosed.

U.S. Pat. No. 5,867,588, Feb. 25, 1989, Marquardt describes a grid to be placed over an image of the human face for the purposes of facial identification and to determine what constitutes beauty. Marquardt discloses a grid composed of interrelated pentagons and five-pointed stars. Points along the grid are then correlated with various aspects of individual facial features. This process reflects back to DaVinci's understanding of man's relationship to the five-pointed star exemplified in the famous drawing of a man inscribed in a five-pointed star with his limbs outstretched within the circumference of a circle. The golden section is intrinsic in the structure of the pentagon and the five-pointed star. Marquardt is able to correlate positions of the disclosed grid with the golden section for this reason. His invention is static and only applicable to a frontal view of the human face.

The golden section refers to a well-established mathematical ratio that relates segments of different sizes to each other. The golden section is the division of a line into two parts where the smallest part of the line is to the largest part of the line as the largest part of the line is to the entire line. If the line in question were to be divided in half, the decimal equivalent would be 0.5. The decimal equivalent of the golden section is 0.618. The square root of five, minus one, divided by two, also expresses its value. A remarkable property of this number is demonstrated by the following two equations: $1/.618=1.618$ and $1+.618=1.618$. Add 0.618 to one, or divide one by 0.618, either way you get the same answer.

SUMMARY OF INVENTION

To successfully render a life-like image of a person's face, the position and proportion of their individual features are of extreme importance. Comparing the work of those who are skilled in this art with those who are not provides a means of discerning which configurations are the most problematic. The relative size, shape and placement of the eyes, nose and mouth are among the most common errors. Comparable inconsistencies of proportion and position can be observed in renderings of the entire human body.

What is needed is a device that will assist a user of this device in correctly placing the subject's individual features in the proper proportion and position. The present invention provides the users with a novel device and an effective way to increase the accuracy of their renderings in addition to teaching about the mathematics of proportion that are found in the golden section.

The device also teaches about the mathematical ratio first presented by Archimedes who once said, "Give me a lever long enough and a place to stand and I could lift the world."

The lever and fulcrum are an example of a simple machine. Archimedes also said, "The ratio of the weight moved to the weight moving it is the inverse ratio of the distances from the center." The placement of the fulcrum determines the amount of force needed to move the lever. If the fulcrum is located at the half-way point of the lever, 0.5, then the force applied will be equal to the force released.

As the distance between the fulcrum and the force applied increases, then the force necessary to move the lever decreases in a ratio that is consistent with the distance moved, causing the speed of the procedure to slow down. If the fulcrum moves closer to the force applied then more force is needed and the speed of the action is increased.

The construction of the device of the present invention utilizes the ratio of the golden section combined with the principle of the simple machine known as a fulcrum and lever, whereby the position of the fulcrum will be located at the golden section point, 0.618.

Because the present invention can be articulated from either end, it is possible to demonstrate how the placement of the fulcrum creates two separate dynamics. When using the device from the end that features eyelet 22, the fulcrum is at a distance greater than halfway. When using the device from the end that features eyelet 33, the fulcrum is at a distance closer than halfway. This understanding can be applied when adjusting the size of the device.

Accordingly, it is the object of the invention to provide an adjustable tool to indicate the presence of the golden section in both the creations of nature and the designs of mankind.

It is another object of the invention to provide a device that is able to accurately determine the size and relative position of the various features that determine the appearance of an individual human face, and transfer that information from a source image to a secondary surface.

It is also an object of the invention to determine, with accuracy, the size and relative position of the various features that determine an individual human body, and transfer that information from a source image to a secondary surface.

It is a further object of the invention to provide a device that can be adjusted to a compact size that can be carried in one's pocket and provide the functions mentioned above.

Still another object of the invention is to provide a useful tool that is easy to operate and inexpensive to manufacture.

Yet another object of the invention is to provide a tool that enables the user to study the principles demonstrated by a looped series of connected levers, sequenced to diminish in length by golden section ratio with fulcrums positioned at golden section points.

It is also an object of the invention to provide designers of jewelry, furniture and other man-made objects with a means to proportion parts of their creations in accordance with the natural ratios of the golden section.

Another object of the invention is to provide plastic surgeons and other doctors and dentists who practice corrective medical procedures with a device to aid them in the process of reconfiguring misaligned features in accordance with the golden section.

It is also an object of the invention to provide artists and designers with a tool to create abstract and ornamental images that incorporate the golden section.

An additional object of the invention is to provide a tool that allows for the construction of pentagons and five-pointed stars, circles, parallelograms, regular polygons and the regular stars associated with them.

Yet another object of the invention is to provide a tool for scientists to examine the components of matter for configurations that provide examples of the golden section.

Still another object of the invention is to provide a useful tool for design engineers to create more effective vehicles and machines that make use of the golden section.

It is also an object of the invention to provide engineers with a looped series of connected levers, sequenced to diminish in length by golden section ratio with fulcrums positioned at golden section points, to provide a means to allow for the creation of more efficient machines.

Another object of the invention is to provide biologists with a method for examining various life forms for examples of the golden section.

One other object of the invention is to provide a tool that can be modeled into a digital version for individuals who utilize computers in the methodology of their creations.

The present invention is an adjustable device for locating golden section points. In addition to identifying the location of golden section points, it also provides a means to transfer this information from a source image to a secondary surface. The invention is comprised of a plurality of paired blades that diminish in length by a ratio that is consistent with the golden section.

The blades are coupled to pivot at golden section points that occur along the length of said blades and at the endpoints of said blades. This configuration provides a looped series of connected levers, sequenced to diminish in length by golden section ratio, with fulcrums positioned at golden section points.

The blades are coupled with eyelets that allow for a marking implement to score the surface on which the device rests. The device is bilaterally symmetrical and maintains consistent golden section proportions regardless of the size to which it is adjusted.

One way to utilize the present invention requires that it be placed directly on the surface of a source image and adjusted so that the area defined by the inner circumference of two eyelets corresponds with two positions on the source image. This process of adjustment is called tuning; it sets the device to be in sync with the specific geometry of the image. Pulling the top corner, eyelet 22, and the bottom corner, eyelet 33, apart will lengthen the invention, and pushing them together will cause the device to contract.

If, for example, the subject in question is a face, the pupils of both eyes are suggested locations for alignment, as seen in FIG. 3G. However, any two points can be applied to effectively utilize the invention. Once the pupils have been set, the device is considered tuned and it can be moved to another surface and placed in the location where the new image is to be rendered.

The invention now functions as a template for a pointed implement to make marks that correspond to each pupil. As an example, in FIG. 3G the center of eyelet 25 marks the location of the left pupil, and the center of eyelet 26 marks the location of the right pupil.

The secondary surface now has two marks indicating the location of the right and left pupils as they appeared in the source image.

Return the invention to the source image and rotate it 180 degrees so the same two eyelets are still aligned to the pupils, FIG. 3H, only now eyelet 26 will correlate with the left pupil and eyelet 25 with the right pupil. This rotation will provide new points that then can be transferred as mentioned above.

If the points that have been transferred are not considered sufficient to complete the secondary image, the user can return the invention to the source image and tune it to another configuration that will facilitate the transfer of additional points.

The device can be utilized horizontally, vertically, or anywhere in between to locate new points on the source image.

In the preferred embodiment, the blades are transparent to allow for greater visibility of the source image. This process of locating and transferring points is not limited to faces and can be applied to the entire body, or individual parts of the body, as well as other subjects both natural and man made.

The wrists align to eyelet 25 and eyelet 26. The shoulders align to eyelet 23 and eyelet 24.

Figure 4:
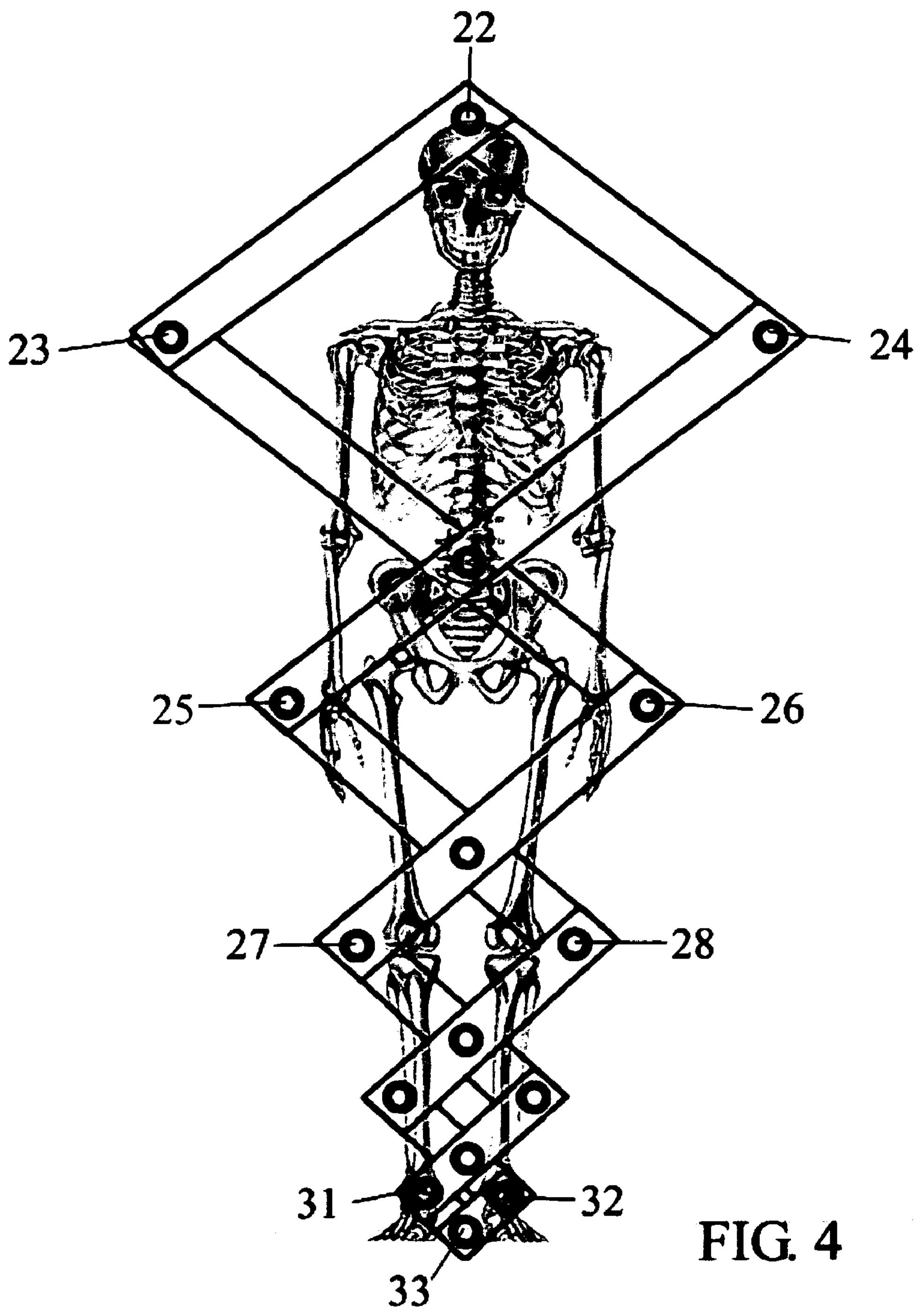
FIG. 4 shows the device over an image of a human skeleton tuned to the top of the skull, eyelet 22, and to the bottom of the feet, eyelet 33. The ankles align to eyelet 31 and eyelet 32. The knees align to eyelet 27 and eyelet 28.
Figure 4A:
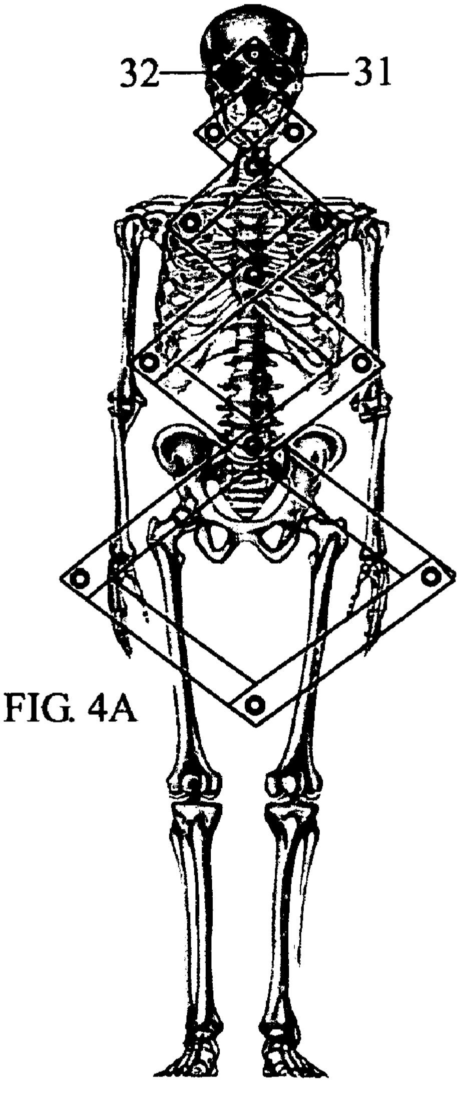

FIG. 4A shows the device tuned so that eyelet 32 links to the center of the right eye socket, and eyelet 31 links to the center of left eye socket.

Figure 4B:
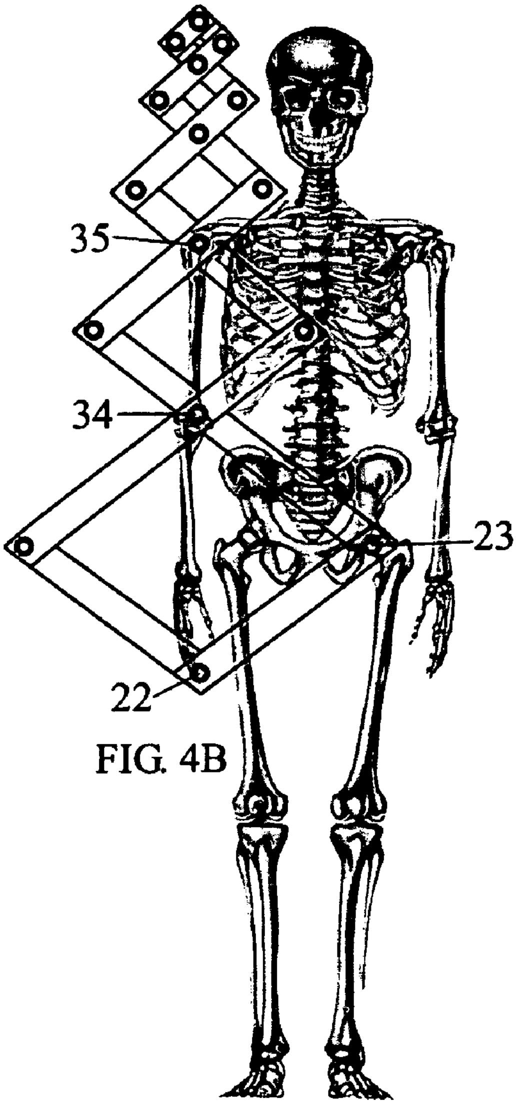

FIG. 4B shows the device tuned to the alignment of FIG. 4A. It reveals that eyelet 35 links to the left shoulder, eyelet 34, to the elbow joint, eyelet 22, to the finger tips of the hand, and eyelet 23 to the top of the right leg.

Figures 4C, 4D:
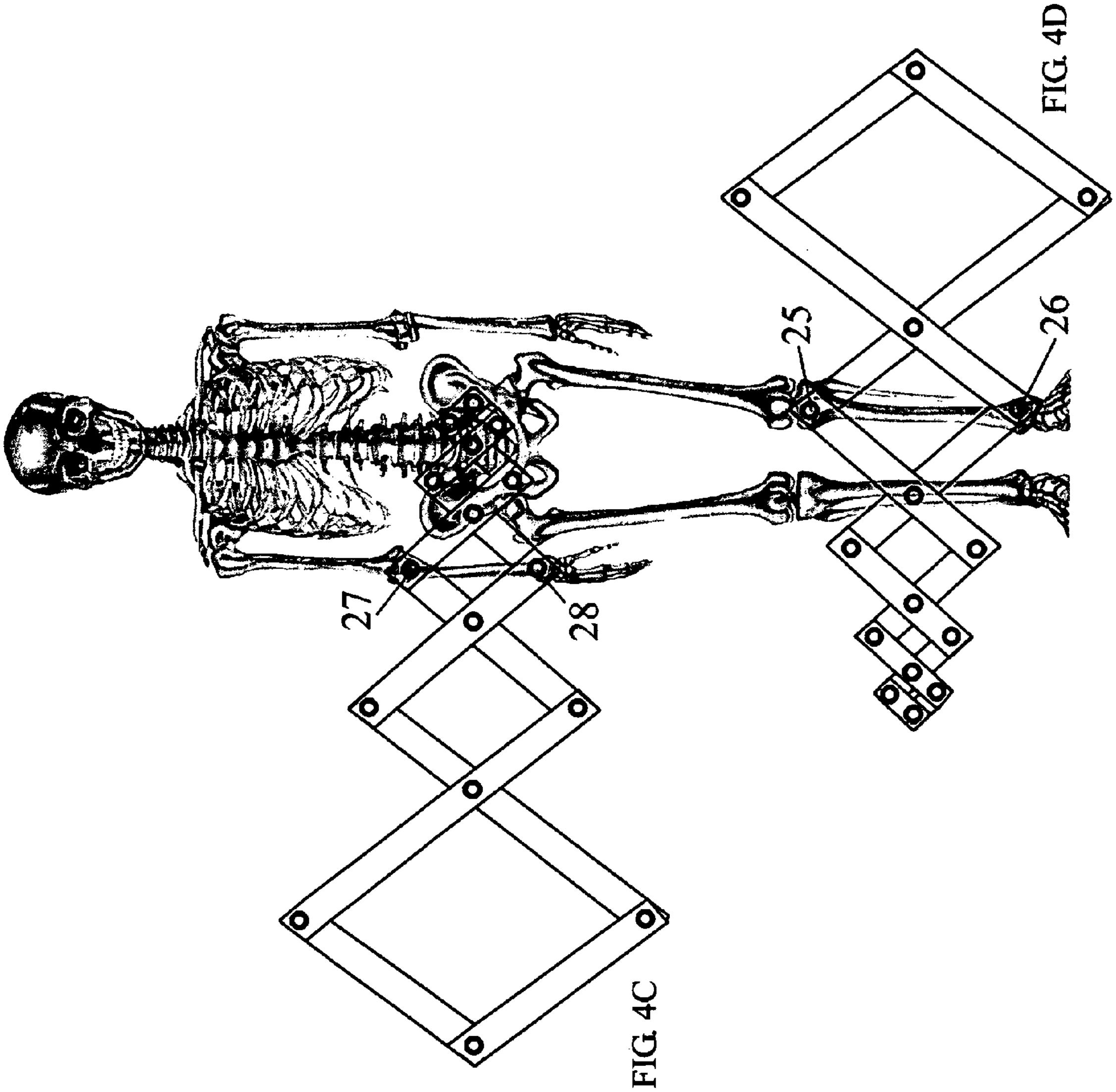

FIG. 4C shows the device tuned to the alignment of FIG. 4A rotated clockwise 90 degrees. The length of the right forearm is indicated by eyelet 27 and eyelet 28.

FIG. 4D shows the device tuned to the alignment of FIG. 4A rotated counterclockwise 90 degrees. The length of the lower leg is indicated by eyelet 25 and eyelet 26.

Figure 1:
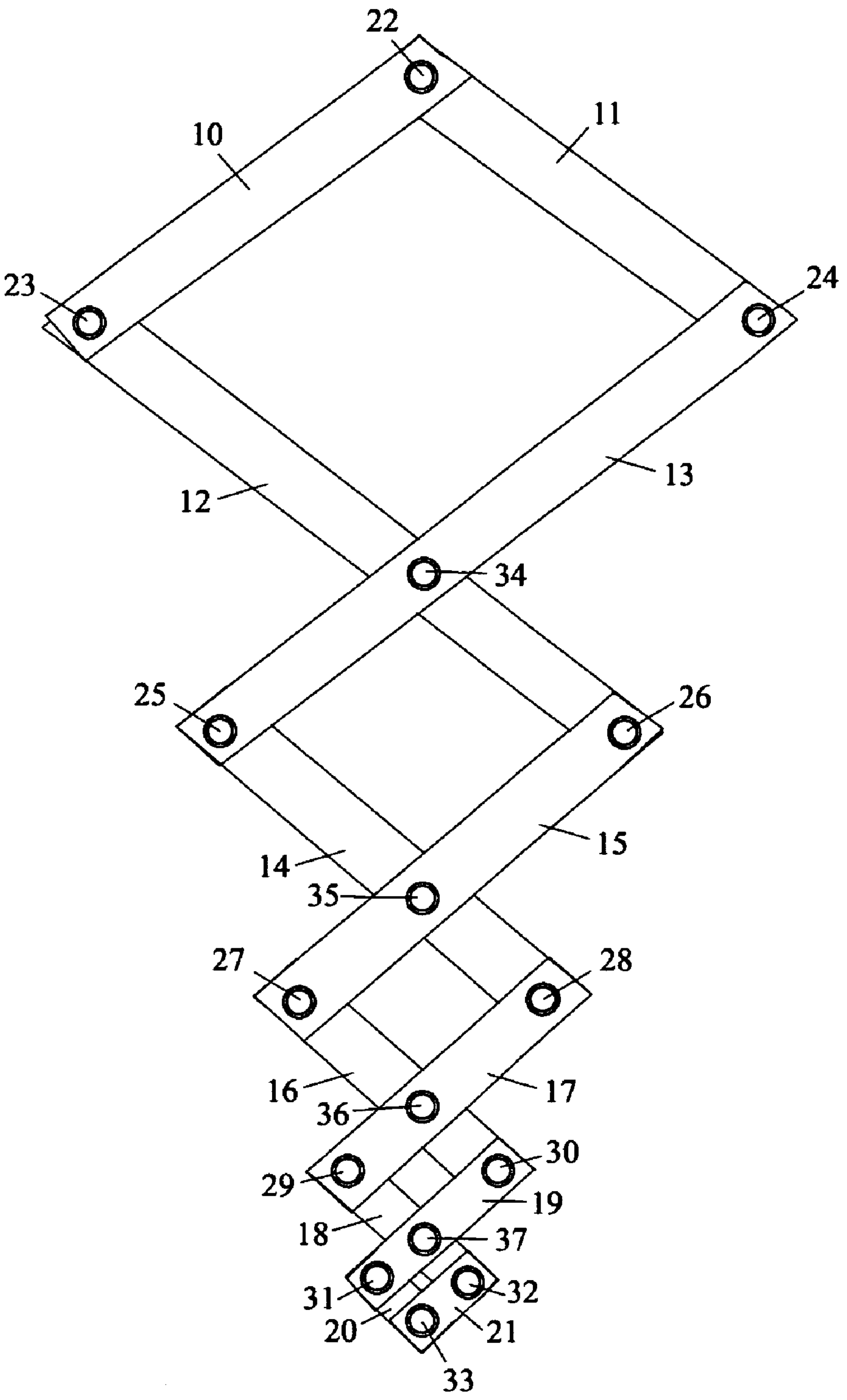
FIG. 1 shows the device expanded to more than twice its smallest size.
Figure 5:
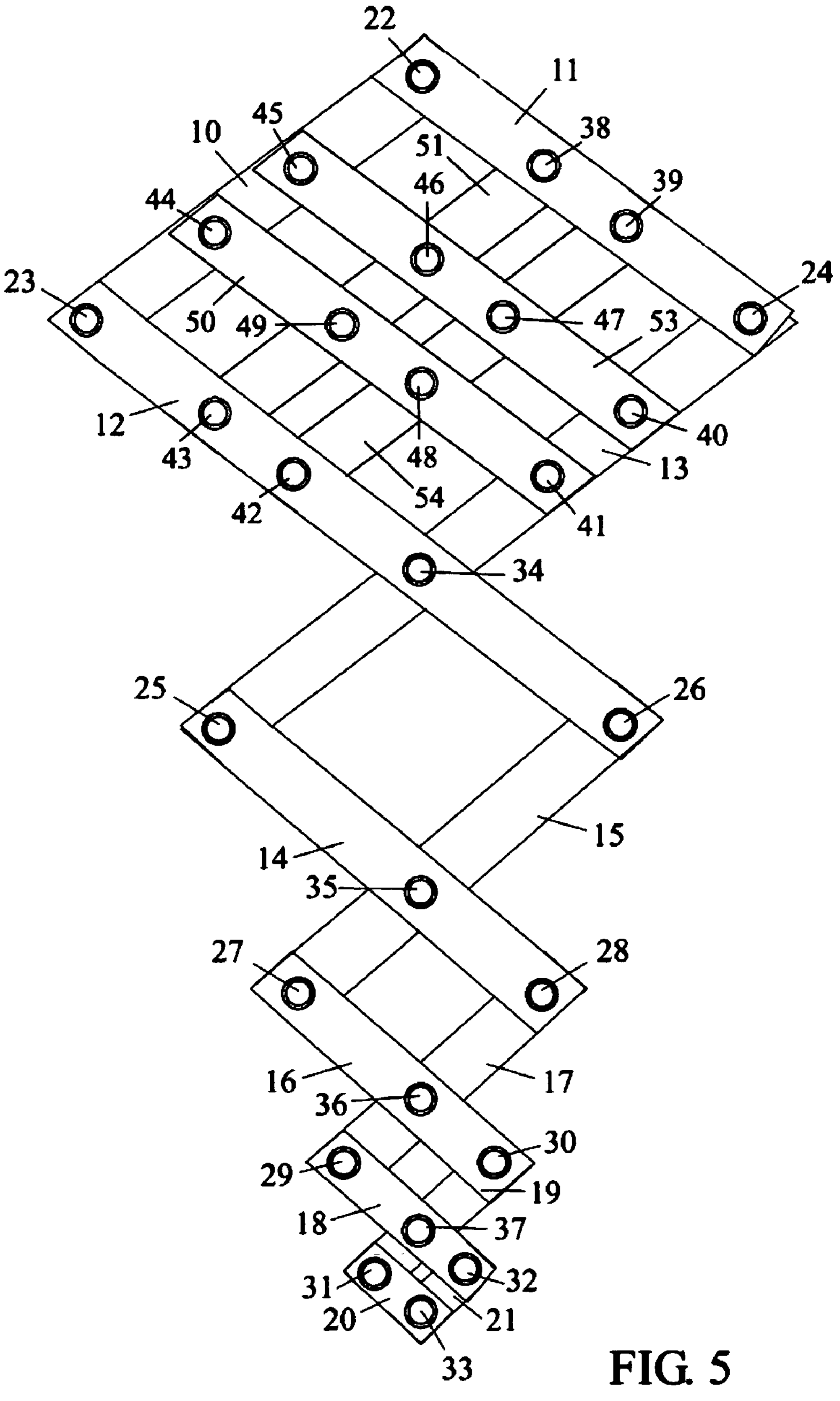

FIG. 5 shows the device in the same position as in FIG. 1 with the addition of four blades and twelve eyelets.

Figure 5A:
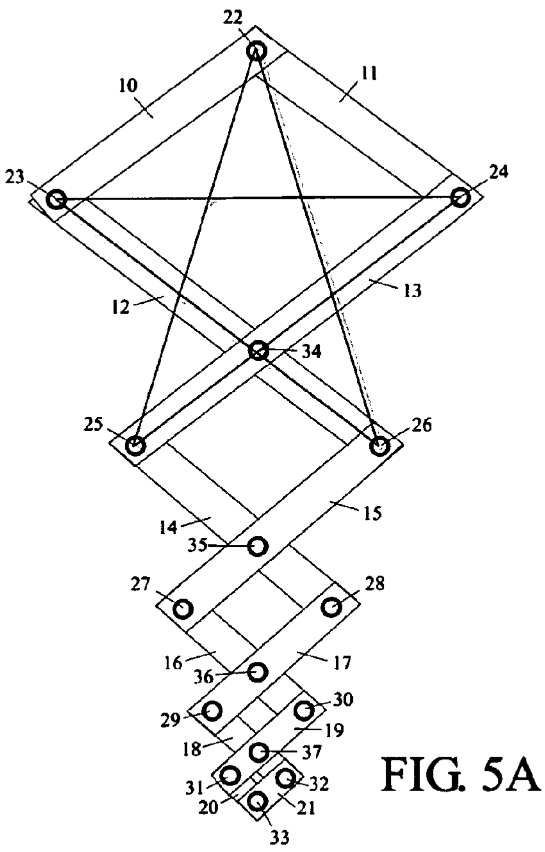

FIG. 5A shows the device of FIG. 1 used as a template to create a five-pointed star. The points used to transfer the star are eyelet 22, eyelet 26, eyelet 23, eyelet 24, and eyelet 25.

Figure 5B:
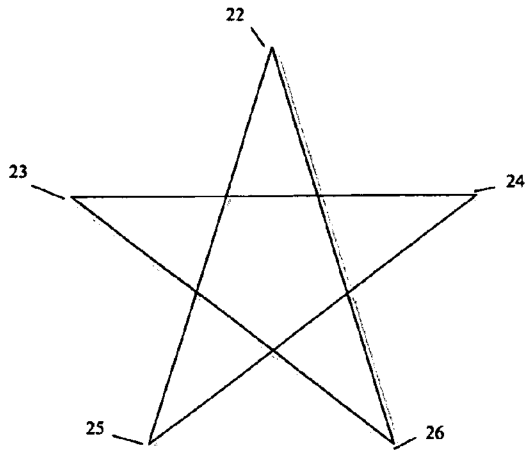

FIG. 5B shows the five-pointed star created by the points transferred from FIG. 5A by connecting eyelet 22 to eyelet 26 to eyelet 23 to eyelet 24 to eyelet 25 and back to eyelet 22.

Figure 5C:
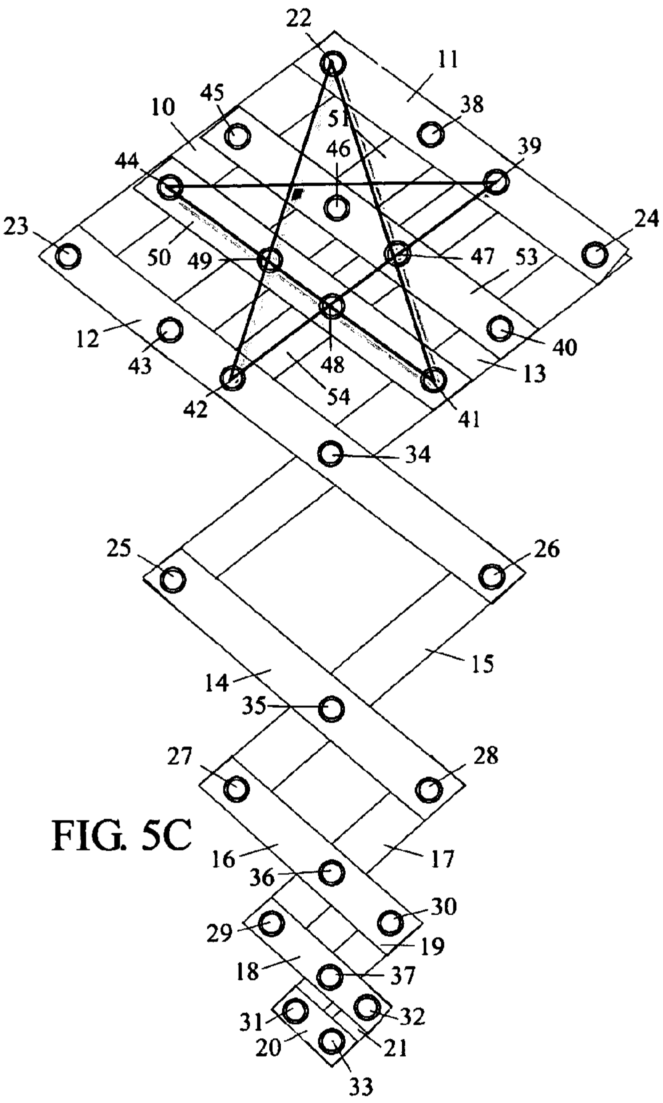

FIG. 5C shows the device of FIG. 5 used as a template to create another five-pointed star. The points used to transfer the star are eyelet 22, eyelet 41, eyelet 44, eyelet 39, and eyelet 42.

Figure 5D:
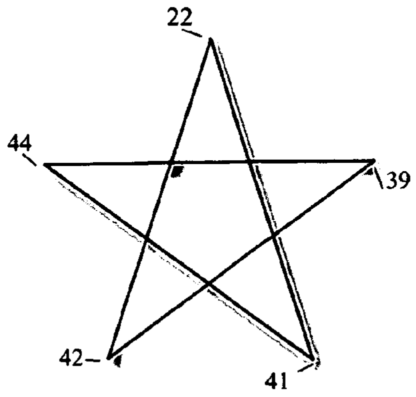

FIG. 5D shows the star created by the points transferred from FIG. 5C by connecting eyelet 22 to eyelet 41 to eyelet 44 to eyelet 39 to eyelet 42 and back to eyelet 22.

Figure 5G:
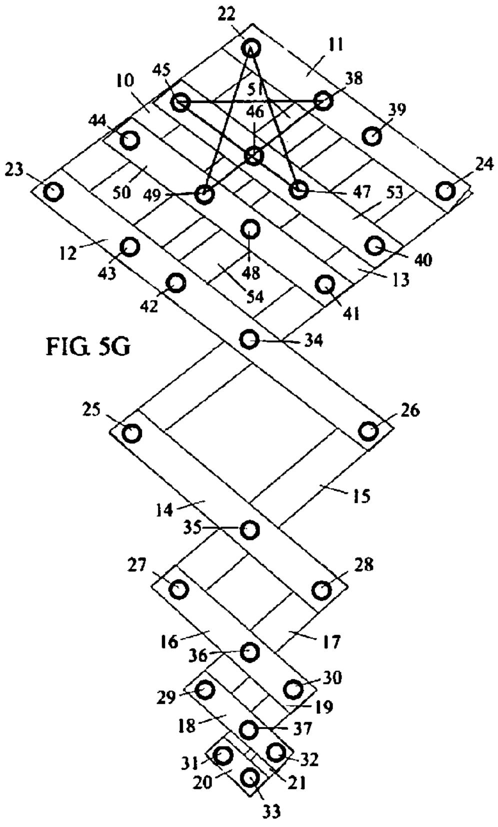

FIG. 5G shows the device of FIG. 5 used as a template to create yet another five-pointed star. The points used to transfer this star are eyelet 22, eyelet 38, eyelet 47, eyelet 49, and eyelet 45.

Figure 5J:
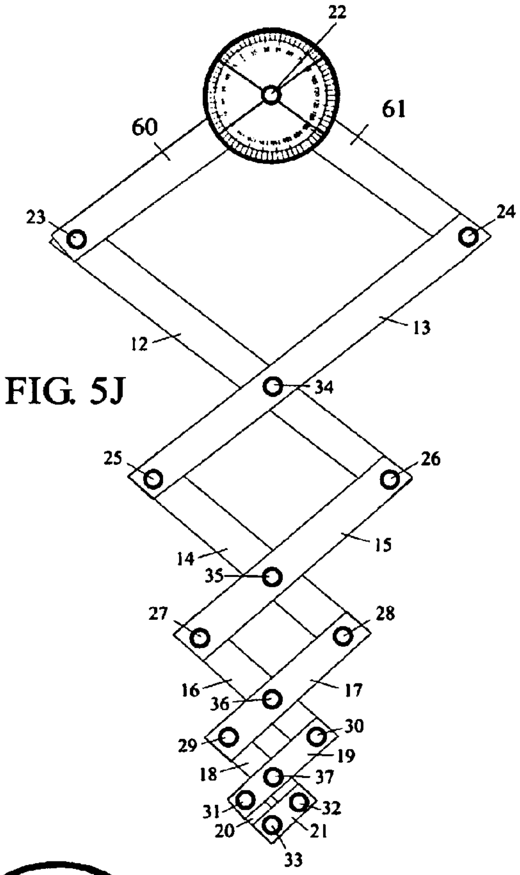
Figure 5H:
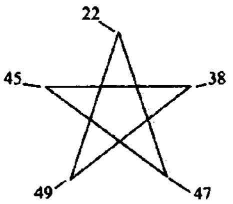

FIG. 5H shows the star created by the points transferred from FIG. 5G by connecting eyelet 22 to eyelet 47 to eyelet 45 to eyelet 38 to eyelet 49 and back to eyelet 22.

FIG. 5J shows the device as it was in FIG. 1 with the protractor added to the end of blade 60 and blade 61.

Figure 5K:
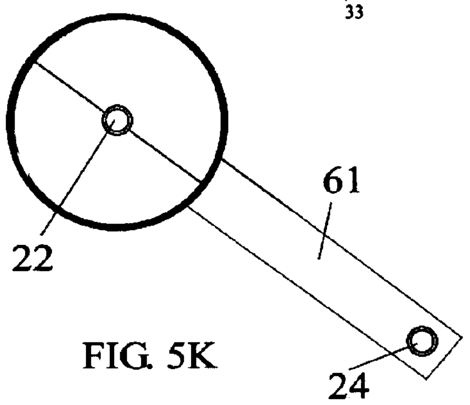

FIG. 5K shows blade 61, eyelet 22 and eyelet 24, isolated from the entire device.

DETAILED DESCRIPTION OF THE INVENTION

The present invention provides an adjustable tool that combines principles of the golden section with a lever and fulcrum. The synergy of these two constants creates the unique and novel properties of the device. The invention is comprised of a plurality of paired blades that diminish in length by a ratio that is consistent with the golden section. The blades are coupled to pivot at golden section points that occur along the length of said blades and at the endpoints of said blades, providing a looped series of connected levers, sequenced to diminish in length by golden section ratio with fulcrums positioned at golden section points.

The blades are coupled with eyelets that allow a marking implement to score the surface on which the device rests. The device is bilaterally symmetrical and the relationship of blades and eyelets maintains its golden section ratio regardless of the size to which the device is adjusted.

The embodiments of the present invention are described with reference to the aforementioned drawings. Any modifications, variations or adaptations that rely upon the teachings of the present invention are considered to be within the scope and spirit of the present invention.

Figure 1A:
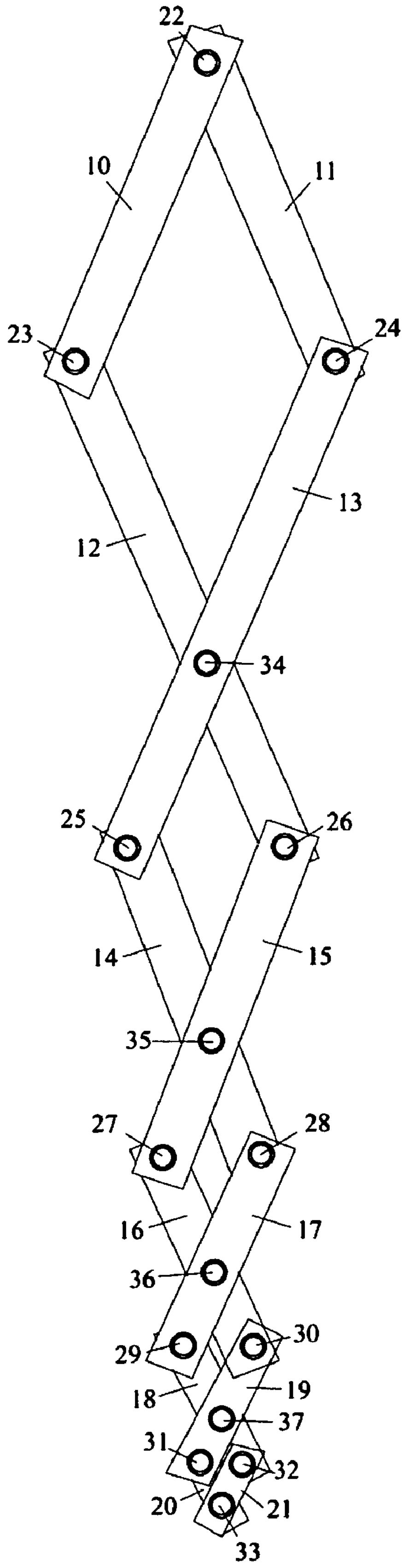
FIG. 1A shows the device fully expanded.
Figure 1B:
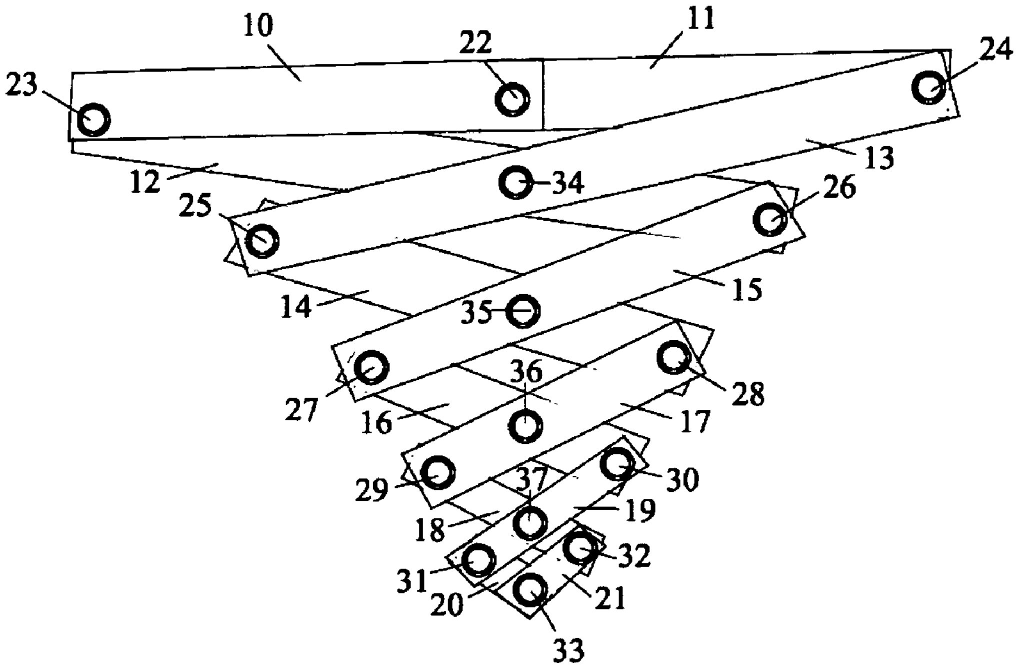
FIG. 1B shows the device fully compacted.
Figure 1C:
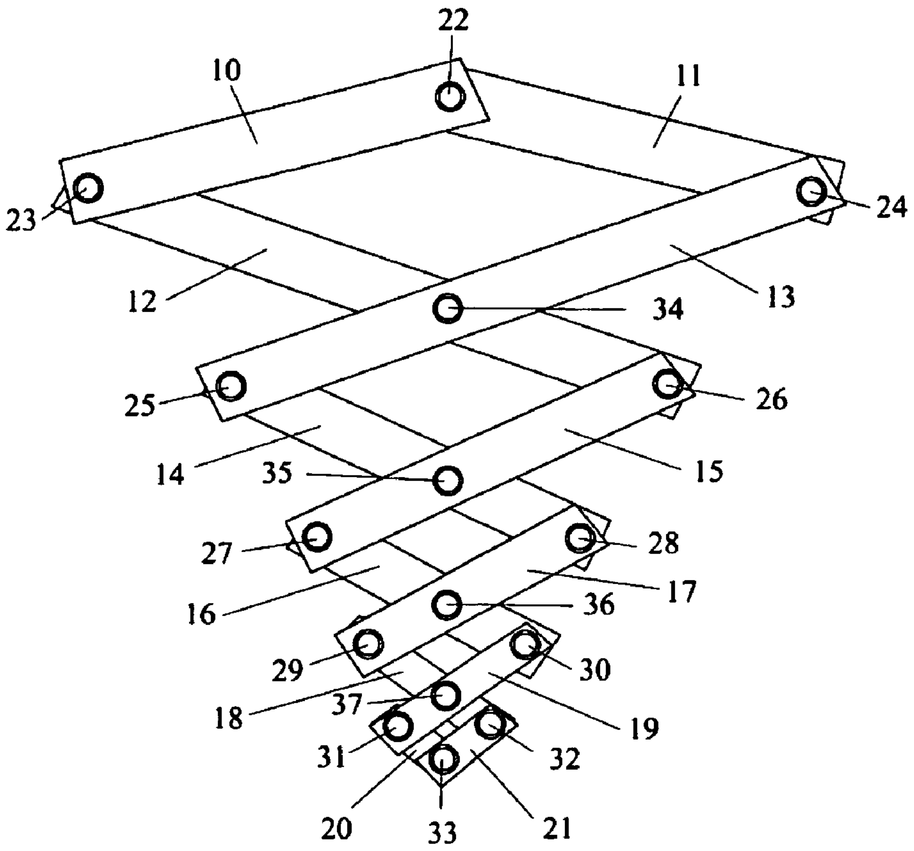
FIG. 1C shows the device in a position between FIG. 1 and FIG. 1B.
Figure 2:
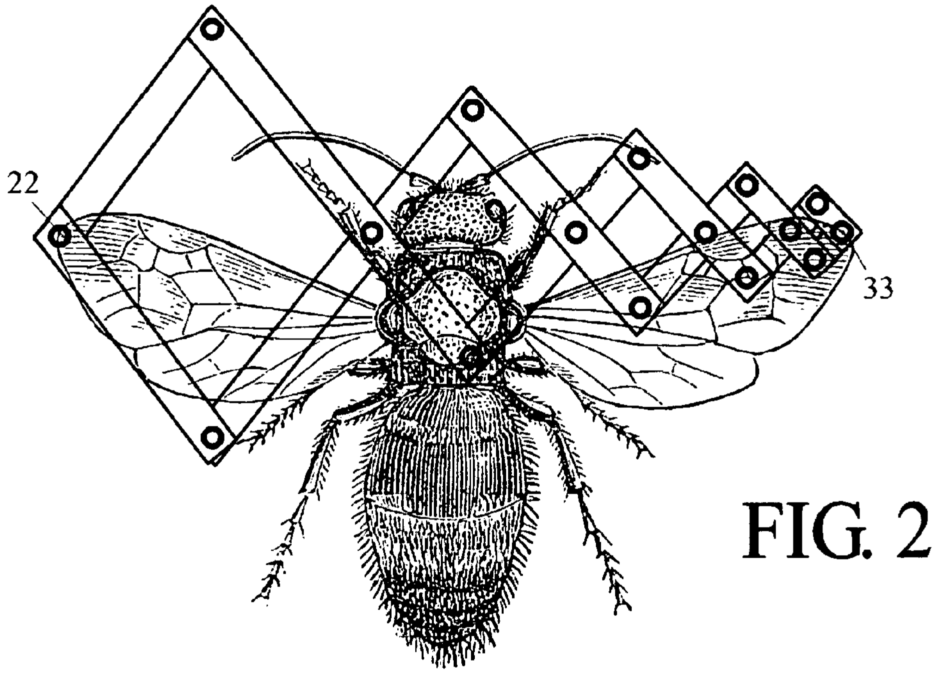
FIG. 2 shows a winged male ant known as Mutilla europea with the device tuned to the length of his wingspan, with eyelet 22 at the tip of the left wing and eyelet 33 at the tip of the right wing.
Figure 2A:
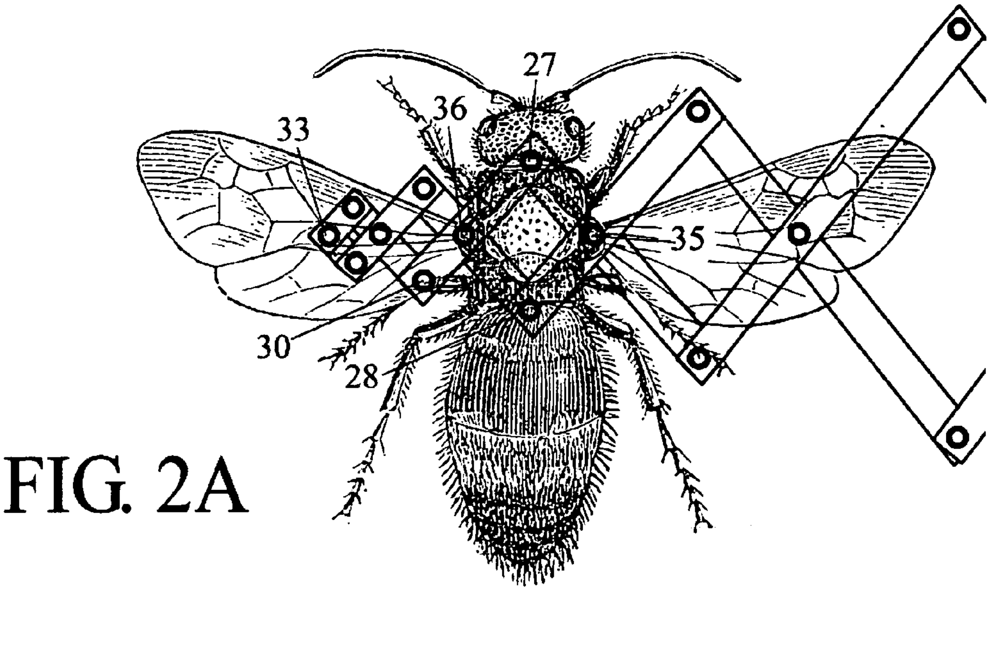
FIG. 2A shows the device still tuned to the configuration shown in FIG. 2, but flipped horizontally. The middle parallelogram formed by eyelet 27, eyelet 35, eyelet 28, and eyelet 36 coincides with the parameters of the ant's thorax.
Figure 2B:
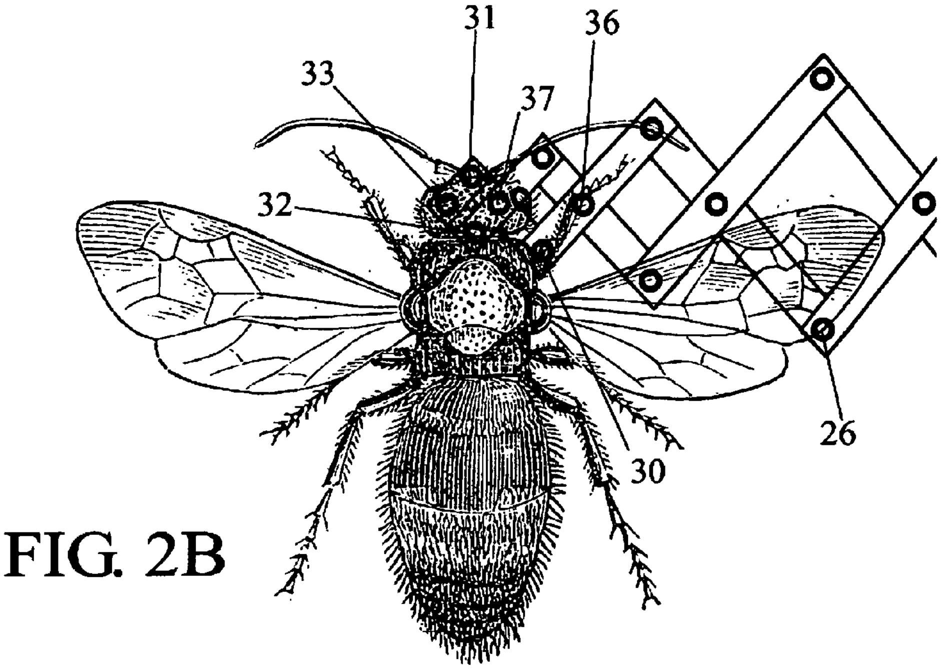
FIG. 2B shows the device still tuned to the wingtips of FIG. 2. The back and of the ant's head is marked by eyelet 32, and the front of his head is defined by eyelet 31. The edge of his left wing coincides with eyelet 26, and eyelet 30 indicates the beginning of his right front leg.
Figure 2C:
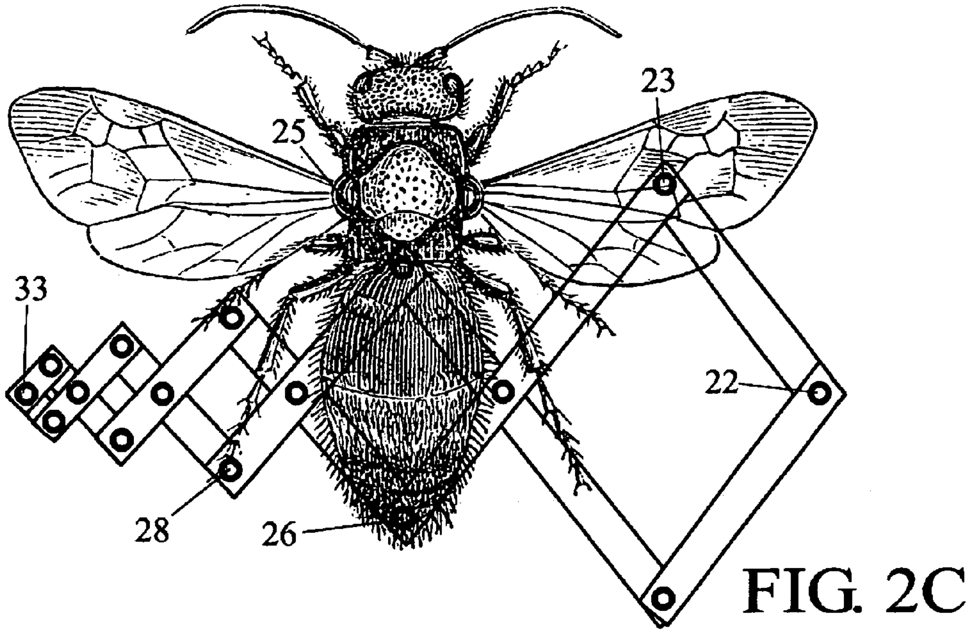
FIG. 2C shows the device still tuned to the wingtips of FIG. 2. The beginning of the ant's abdomen is indicated by eyelet 25, and it terminates at eyelet 26.
Figure 2D:
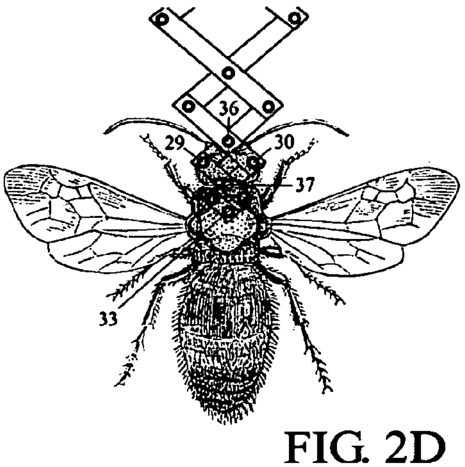
FIG. 2D shows the device in another tuning. It is set so that eyelet 29 and eyelet 30 align to the ant's eyes.
Figure 2E:
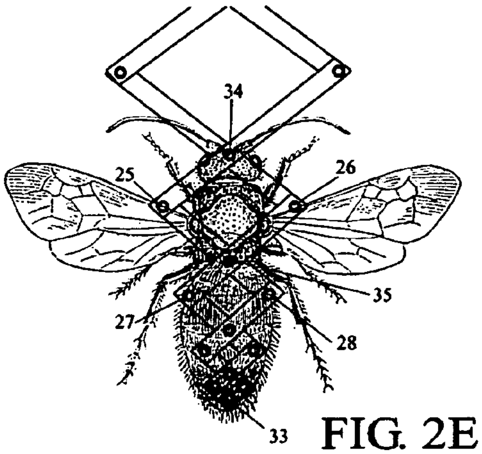
FIG. 2E shows the device tuned as it was in FIG. 2D. The length of the ant is defined by eyelet 34 at the tip of his head and eyelet 33 at the rear of his abdomen. The top edge of his left wing is marked by eyelet 25. Eyelet 26 coincides with the top edge of his right wing. The thorax and abdomen join at eyelet 35. The edges of an abdominal segment are defined by eyelet 27 and eyelet 28.
Figure 2F:
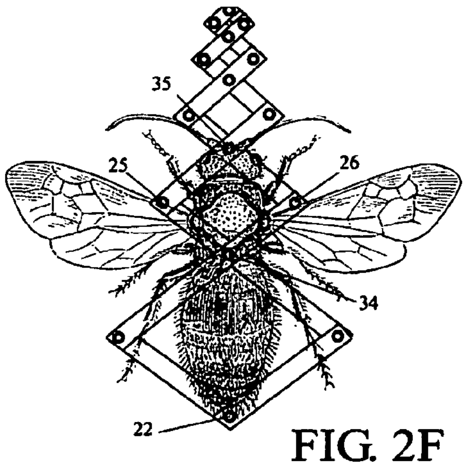
FIG. 2F shows the device still set to the eyes of FIG. 2D but rotated 180 degrees on its Y axis. The back of the abdomen is marked by eyelet 22; eyelet 34 appears where the abdomen joins the thorax. The front tip of his head is eyelet 35. The top edges of the left and right wings are marked by eyelet 25 and eyelet 26.
Figure 2G:
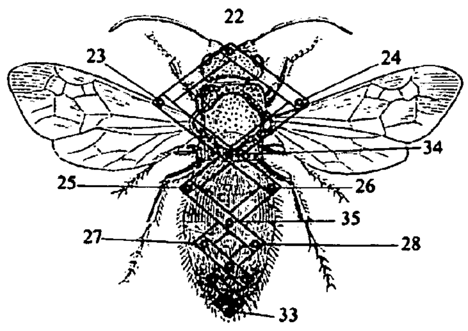
FIG. 2G shows the device tuned to the pair of points that define the length of the ant's body. It is set to align with the tip of the head, eyelet 22, and the rear of the abdomen, eyelet 33. An abdominal segment is defined by eyelet 27 and eyelet 28. These two points are also consistent with the last division of the ant's rear legs.
Figure 3:
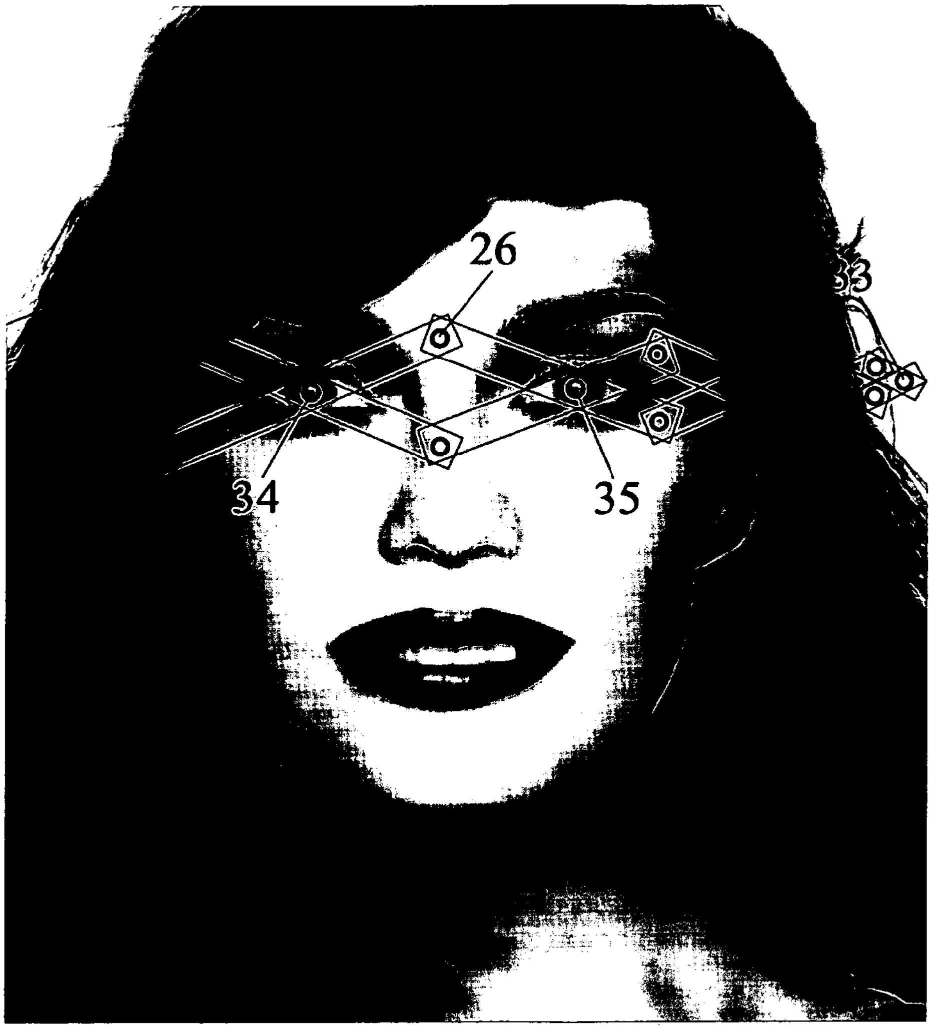
FIG. 3 shows the device placed horizontally on a woman's face and tuned to the pupils, eyelet 34 and eyelet 35.
Figure 3A:
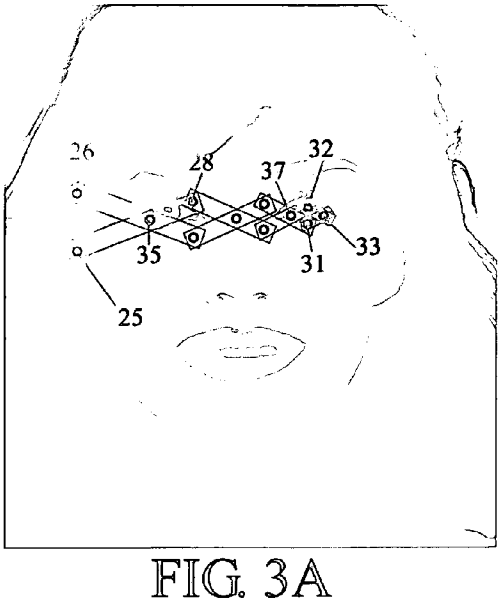
FIG. 3A shows the device tuned as it was in FIG. 3. The parameters of the right eye are defined by eyelet 31, eyelet 33, eyelet 32, and eyelet 37.
Figure 3B:
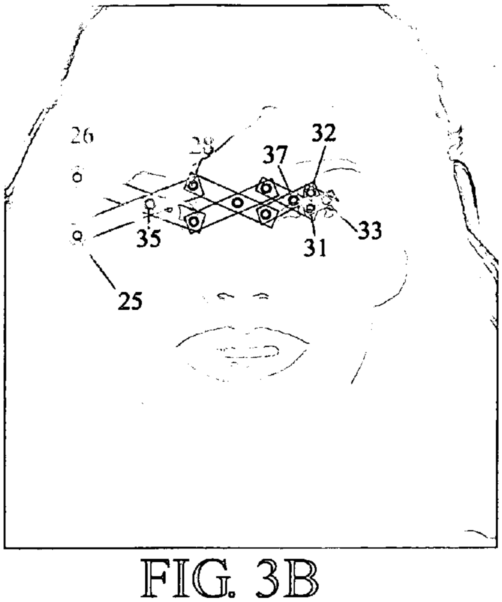
FIG. 3B shows the device tuned as it was in FIG. 3. The pupil of the right eye is eyelet 31. The upper lid of the right eye is defined by eyelet 37, eyelet 32, and eyelet 33.
Figure 3C:
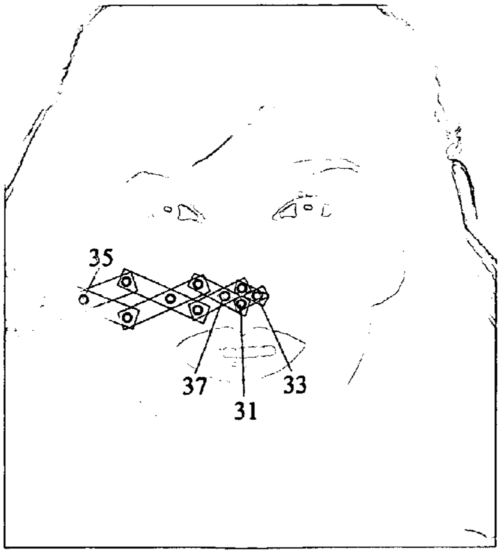
FIG. 3C shows the device tuned as it was in FIG. 3. The nostrils are defined by eyelet 33 and eyelet 37, the lower edge of the left ear by eyelet 35.
Figure 3D:
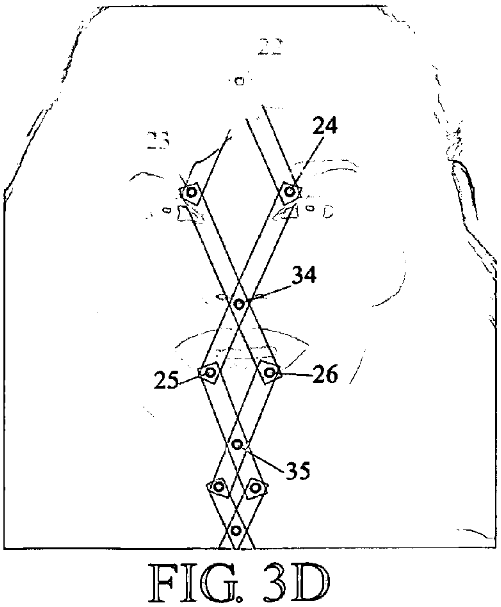
FIG. 3D shows the device tuned as it was in FIG. 3 but rotated vertically. The middle of the bottom of the chin is marked by eyelet 35. The middle of the bottom of the nose is marked by eyelet 34. The bottom of the lower lip is defined by eyelet 25 and eyelet 26.
Figure 3E:
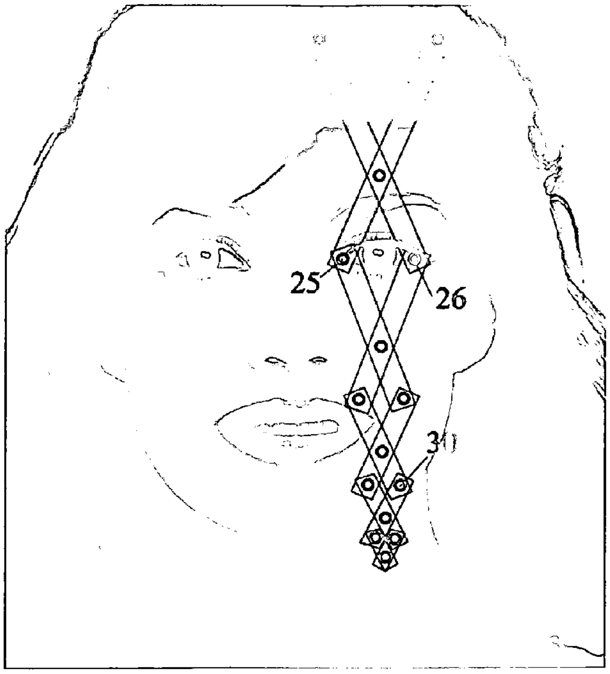
FIG. 3E shows the device tuned as it was in FIG. 3 but rotated vertically. The right lower eyelid is defined by eyelet 25 and eyelet 26. The edge of the right jaw line coincides with eyelet 30.
Figure 3F:
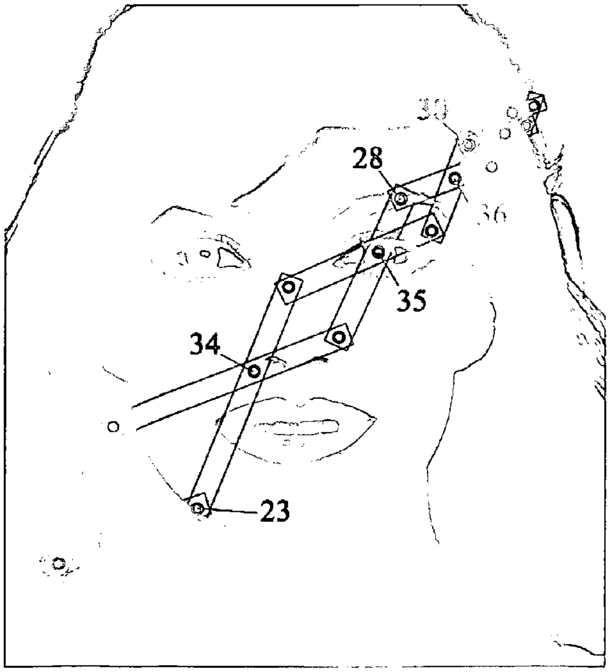
FIG. 3F shows the device set as in FIG. 3 rotated 45 degrees. The right eyebrow is divided by eyelet 28, eyelet 35 aligns with the right pupil, and eyelet 23 marks the left lower jaw line.
Figure 3G:
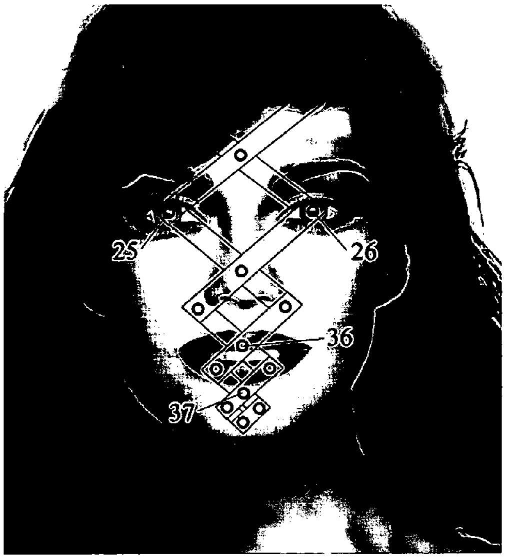
FIG. 3G tunes the device to align with the left pupil, eyelet 25, and the right pupil, eyelet 26. The middle of the bottom of the upper lip is marked by eyelet 36.
Figure 3H:
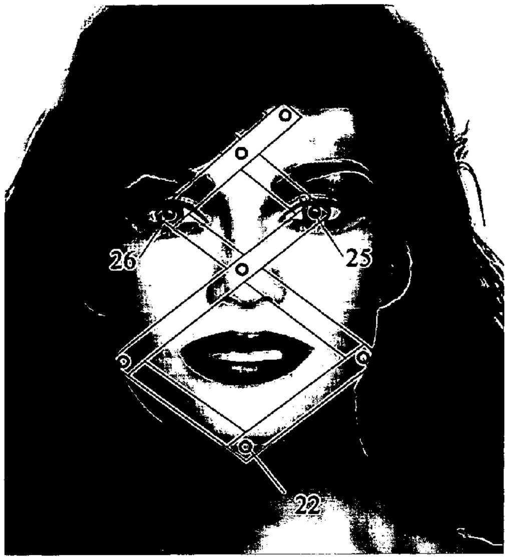
FIG. 3H shows the device tuned as it was in FIG. 3G and rotated 180 degrees. The jaw line is defined by eyelet 24, eyelet 22, and eyelet 23. The left pupil is marked by eyelet 26 and the right pupil is marked by eyelet 25.
Figure 3J:
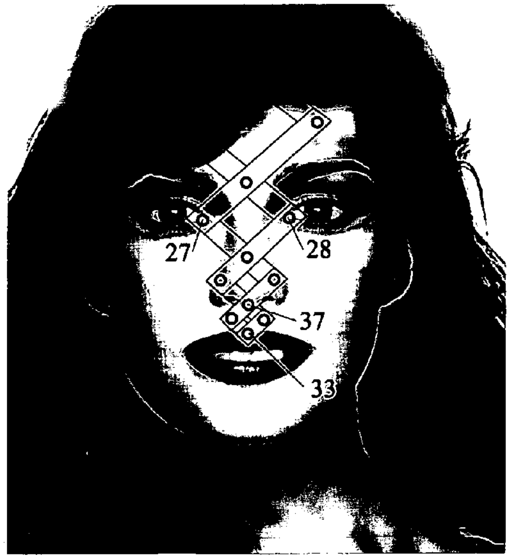
FIG. 3J shows the device tuned as it was in FIG. 3G. The top of the upper lip is eyelet 33, eyelet 37 marks the bottom of the nose, eyelet 27 the inner comer of the left eye and eyelet 28 is the inner comer of the right eye.
Figure 3K:
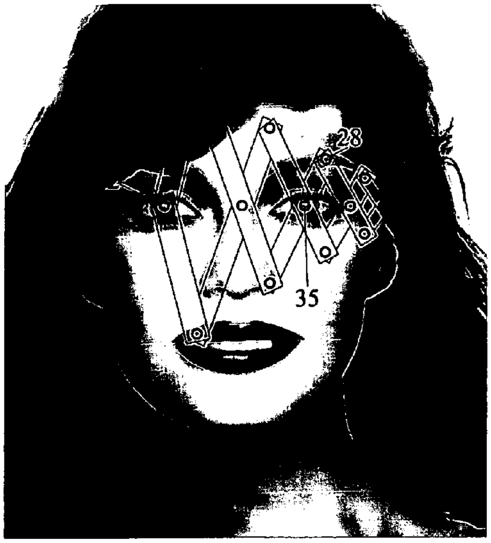
FIG. 3K shows the device tuned to the left pupil, eyelet 22, and the right pupil, eyelet 35.
Figure 3L:
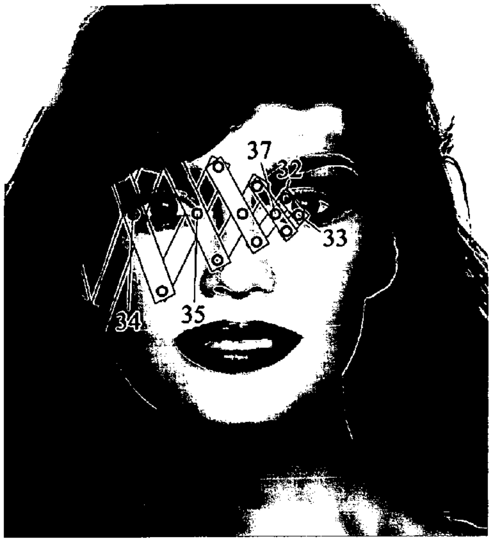
FIG. 3L shows the device tuned as in FIG. 3K. The comers of the left eye are defined by eyelet 34 and eyelet 35. The inside comer of the right eye is marked by eyelet 37. The upper right eyelid is eyelet 32. The lower right eyelid is eyelet 33.
Figure 3M:
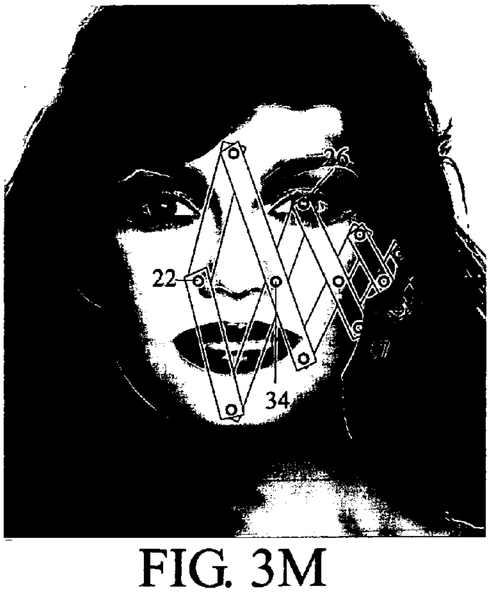
FIG. 3M shows the device tuned as it was in FIG. 3K. The right pupil is marked by eyelet 26, and the outsides of the nostrils are defined by eyelet 22 and eyelet 34. The right jaw line beneath the ear is eyelet 27.
Figure 3N:
FIG. 3N shows the device tuned as it was in FIG. 3K and rotated 45 degrees. The right nostril is marked by eyelet 34. The right comer of the mouth is defined by eyelet 22. The left pupil is marked by eyelet 37.
Figure 3P:
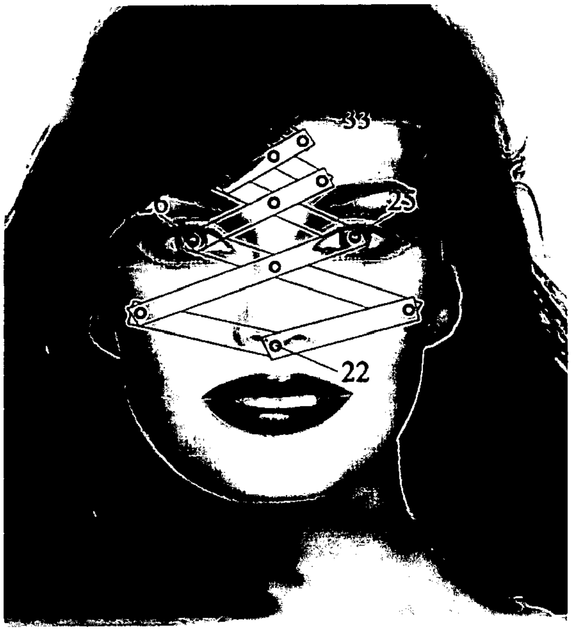
FIG. 3P shows the device tuned to the right pupil, eyelet 25, and the left pupil, eyelet 26. The middle of the bottom of the nose is marked by eyelet 22.
Figure 3R:
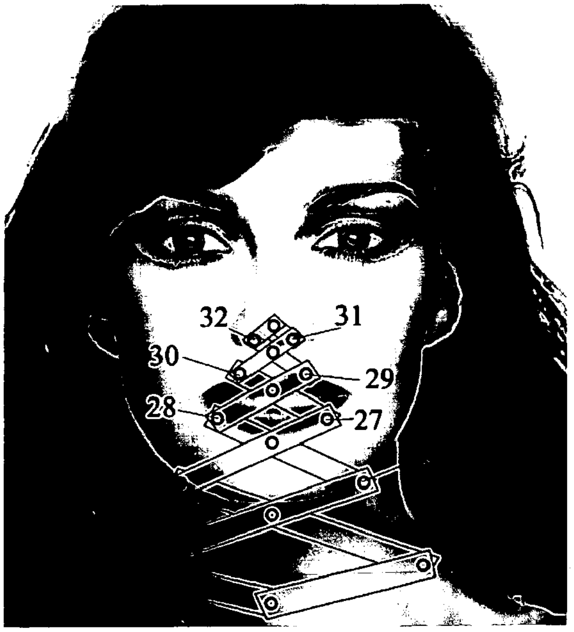
FIG. 3R shows the device tuned as it was in FIG. 3P. The nostrils are defined by eyelet 32 and eyelet 31. At the top of the upper lip are eyelet 30 and eyelet 29. At the bottom of the lower lip are eyelet 28 and eyelet 27.
Figure 3S:
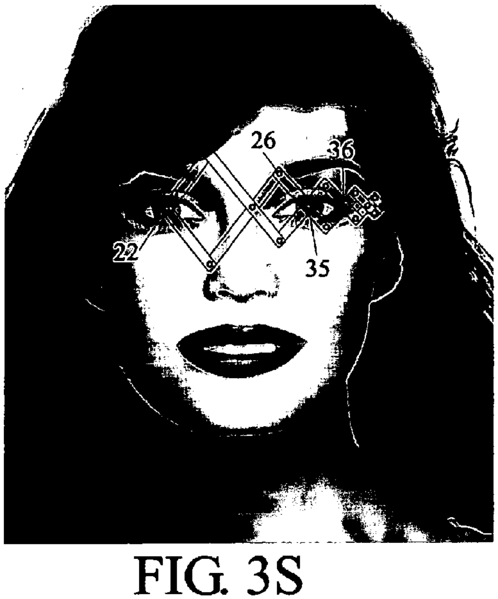
FIG. 3S shows the device tuned to the left pupil, eyelet 22, and the right pupil, eyelet 35. The right eyebrow starts at eyelet 26. The right side of the head is marked by eyelet 33.
Figure 3T:
FIG. 3T Shows the device tuned as it was in FIG. 3S. The right pupil is eyelet 36. The length of the device defines the area of both eyes, with eyelet 22 at the far comer of the left eye and eyelet 33 at the far comer of the right eye.
Figure 3U:
FIG. 3U shows the device tuned as it was in FIG. 3S rotated 90 degrees to a vertical position where the left pupil is marked by eyelet 36. The left jaw line is eyelet 24. The bottom of the top lip directly beneath the left nostril is eyelet 23. The upper left eyelid coincides with eyelet 30 and eyelet 29. The middle of left eyebrow is marked by eyelet 33.
Figure 3V:
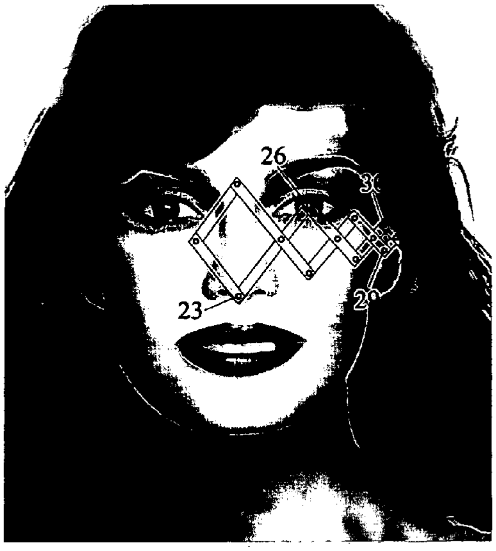
FIG. 3V shows the device tuned as it was in FIG. 3S. The right pupil is eyelet 26. The bottom of the nose directly between both nostrils is eyelet 23. The right side of the face is eyelet 30 and eyelet 29. The edge of the right ear is eyelet 31.

As an example, the device set forth herein has been characterized as a tool to identify the golden section and to provide a guide to an individual wanting to use that information in the creation of a design or work of art, but it is apparent to those skilled in the art that the shape formed by the device in the compacted mode, FIG. 1B, and its transformation to the shape formed by the device in its expanded mode, FIG. 1A, that the present invention could be utilized as toy that provides the illusion of a growing Christmas tree.

Hence, these descriptions and drawings are not to be considered in a limiting sense, as it is understood that the present invention is no way limited to the embodiments illustrated.

FIG. 1A shows the device as viewed from directly above. Blade 12 and blade 13 are of the same length. The length of blade 12 is determined by the location of the center of eyelet 23 on one end and the center of eyelet 26 on the other end. Blade 13 has a length that is determined by the location of the center of eyelet 24 on one end and the center of eyelet 25 on the other. Blade 12 and blade 13 are coupled to pivot by eyelet 34 so that blade 13 is on top of blade 12. The location of eyelet 34 is determined by finding the golden section point for the length of blade 12 and the golden section point for the length of blade 13.

The golden section is determined by the location of the point that divides a segment of a fixed length into two parts, where the smaller part is to the larger part as the larger part is to the entire segment.

The segment of blade 12, determined by the placement of eyelet 26 and eyelet 34, is to the segment of blade 12, determined by the location of eyelet 34 and eyelet 23, as the segment determined by the location of eyelet 23 and eyelet 34 is to the entire length of blade 12. The segment of blade 13, determined by the placement of eyelet 25 and eyelet 34, is to the segment of blade 13, determined by the location of eyelet 34 and eyelet 24, as the segment determined by the location of eyelet 24 and eyelet 34 is to the entire length of blade 12.

Blade 10 and blade 11 are of the same length. The length of blade 10 is determined by the location of the center of eyelet 23 on one end and the center of eyelet 22 on the other end. Blade 11 has a length that is determined by the location of the center of eyelet 24 on one end and the center of eyelet 22 on the other. Blade 10 is the same length as the segment of blade 13, determined by the location of eyelet 34 and eyelet 24. Blade 11 is the same length as the segment of blade 12, determined by the location of eyelet 34 and eyelet 23.

Blade 10 and blade 11 are coupled to pivot at their endpoints by eyelet 22 so that blade 10 is on top. Blade 10 is coupled to pivot to blade 12 by eyelet 23 so that it is on top of blade 12. Blade 11 is coupled to pivot to blade 13 by eyelet 24 so that blade 13 is on top of blade 11.

Blade 14 and blade 15 are of the same length. The length of blade 14 is determined by the location of the center of eyelet 25 on one end and the center of eyelet 28 on the other end. Blade 15 has a length that is determined by the location of the center of eyelet 26 on one end and the center of eyelet 27 on the other.

Blade 14 is the same length as the segment of blade 13, determined by the location of eyelet 34 and eyelet 24. Blade 15 is the same length as the segment of blade 12, determined by the location of eyelet 34 and eyelet 23. Blade 14 and blade 15 are coupled to pivot by eyelet 35 so that blade 15 is on top of blade 14.

The location of eyelet 35 is determined by finding the golden section point for the length of blade 14 and the golden section point for the length of blade 15. The segment of blade 14, determined by the placement of eyelet 28 and eyelet 35, is to the segment of blade 14, determined by the location of eyelet 35 and eyelet 25, as the segment determined by the location of eyelet 25 and eyelet 35 is to the entire length of blade 14.

The segment of blade 15, determined by the placement of eyelet 27 and eyelet 35, is to the segment of blade 15, determined by the location of eyelet 35 and eyelet 26, as the segment determined by the location of eyelet 26 and eyelet 35 is to the entire length of blade 15. Blade 14 is coupled to pivot to blade 13 by eyelet 25 so that blade 13 is on top of blade 14. Blade 15 is coupled to pivot to blade 12 by eyelet 26 so that blade 15 is on top of blade 12.

Blade 16 and blade 17 are of the same length. The length of blade 16 is determined by the location of the center of eyelet 27 on one end and the center of eyelet 30 on the other end. Blade 17 has a length that is determined by the location of the center of eyelet 28 on one end and the center of eyelet 29 on the other.

Blade 16 is the same length as the segment of blade 15 determined by the location of eyelet 35 and eyelet 26. Blade 17 is the same length as the segment of blade 14 determined by the location of eyelet 35 and eyelet 25. Blade 16 and blade 17 are coupled to pivot by eyelet 36 so that blade 17 is on top of blade 16. The location of eyelet 36 is determined by finding the golden section point for the length of blade 16 and the golden section point for the length of blade 17.

The segment of blade 16, determined by the placement of eyelet 30 and eyelet 36, is to the segment of blade 14, determined by the location of eyelet 36 and eyelet 27, as the segment determined by the location of eyelet 27 and eyelet 36 is to the entire length of blade 14.

The segment of blade 17, determined by the placement of eyelet 29 and eyelet 36, is to the segment of blade 17, determined by the location of eyelet 36 and eyelet 28, as the segment determined by the location of eyelet 28 and eyelet 36 is to the entire length of blade 17. Blade 16 is coupled to pivot to blade 15 by eyelet 27 so that blade 15 is on top of blade 16. Blade 17 is coupled to pivot to blade 14 by eyelet 28 so that blade 17 is on top of blade 14.

Blade 18 and blade 19 are of the same length. The length of blade 18 is determined by the location of the center of eyelet 32 on one end and the center of eyelet 29 on the other end. Blade 19 has a length that is determined by the location of the center of eyelet 31 on one end and the center of eyelet 30 on the other.

Blade 18 is the same length as the segment of blade 17 determined by the location of eyelet 36 and eyelet 28. Blade 19 is the same length as the segment of blade 16 determined by the location of eyelet 36 and eyelet 27. Blade 18 and blade 19 are coupled to pivot by eyelet 37 so that blade 19 is on top of blade 18. The location of eyelet 37 is determined by finding the golden section point for the length of blade 18 and the golden section point for the length of blade 19.

The segment of blade 18, determined by the placement of eyelet 32 and eyelet 37, is to the segment of blade 18, determined by the location of eyelet 37 and eyelet 29, as the segment determined by the location of eyelet 29 and eyelet 37, is to the entire length of blade 18.

The segment of blade 19, determined by the placement of eyelet 31 and eyelet 37, is to the segment of blade 19 determined by the location of eyelet 37 and eyelet 30, as the segment determined by the location of eyelet 30 and eyelet 37 is to the entire length of blade 19.

Blade 18 is coupled to pivot to blade 17 by eyelet 29 so that blade 17 is on top of 18. Blade 19 is coupled to pivot to blade 16 by eyelet 30 so that blade 19 is on top of blade 16.

Blade 20 and blade 21 are of the same length. The length of blade 20 is determined by the location of the center of eyelet 33 on one end and the center of eyelet 31 on the other end. Blade 21 has a length that is determined by the location of the center of eyelet 33 on one end and the center of eyelet 32 on the other.

Blade 20 is the same length as the segment of blade 19, determined by the location of eyelet 37 and eyelet 30. Blade 21 is the same length as the segment of blade 18 determined by the location of eyelet 37 and eyelet 29. Blade 20 is coupled to pivot to blade 19 by eyelet 31 so that blade 19 is on top of blade 20. Blade 21 is coupled to pivot to blade 18 by eyelet 32 so that blade 21 is on top of blade 18.

FIG. 5 shows another embodiment of the invention seen in FIG. 1 providing four additional blades and twelve additional eyelets. It conforms to the same parameters established for FIG. 1.

Blade 50 is coupled to blade 10 by eyelet 44 at one end and coupled to blade 13 by eyelet 41 at the other end. Blade 53 is coupled to blade 10 by eyelet 45 at one end and coupled to blade 13 by eyelet 40 at the other end. Blade 51 is coupled to blade 11 by eyelet 38 at one end and coupled to blade 12 by eyelet 43 at the other end.

Blade 54 is coupled to blade 11 by eyelet 39 at one end and coupled to blade 12 by eyelet 42 at the other end.

Blade 50 is coupled to blade 51 by eyelet 49 and to blade 54 by eyelet 48. Blade 53 is coupled to blade 51 by eyelet 46 and to blade 54 by eyelet 47. Eyelet 44 is the golden section point of eyelet 22 and eyelet 23. Eyelet 45 is the golden section point of eyelet 22 and eyelet 44. Eyelet 39 is the golden section point of eyelet 22 and eyelet 24. Eyelet 38 is the golden section point of eyelet 22 and eyelet 39.

Eyelet 41 is the golden section point of eyelet 24 and eyelet 34. Eyelet 40 is the golden section point of eyelet 24 and eyelet 41. Eyelet 42 is the golden section point of eyelet 23 and eyelet 34. Eyelet 43 is the golden section point of eyelet 23 and eyelet 42.

Eyelet 47 is the golden section point of eyelet 45 and eyelet 40. Eyelet 46 is the golden section point of eyelet 45 and eyelet 47. Eyelet 48 is the golden section point of eyelet 44 and eyelet 41. Eyelet 49 is the golden section point of eyelet 44 and eyelet 48. Blade 50, Blade 51, Blade 53, and Blade 54 are the same size as Blade 14 and Blade 15.

FIG. 5J shows the device with the addition of a protractor. The length of blade 60 is determined by the location of eyelet 23 and eyelet 22. Eyelet 22 is located at the center of the circle that forms the protractor located at the end of blade 60. The protractor is marked to denote 5 degree increments in a circle of 360 degrees. Blade 61 is coupled to pivot with blade 60 by eyelet 22 so that blade 60 is on top.

FIG. 5K shows blade 61 isolated from the device. Eyelet 22 appears in the center of the protractor circle that is marked by a line that is parallel to the edges of blade 61. Eyelet 24 is located at the other end of blade 61.

I claim:

1. A device to locate the golden section comprising:

a plurality of paired blades, and a plurality of fasteners, whereby said fasteners couple said blades to pivot at said blades' endpoints, and at golden section points that occur along the length of said blades, whereby a looped series of connected levers are sequenced to diminish in length by golden section ratio, and coupled to pivot at golden section fulcrums.

2. The device of claim 1, wherein additional said blades are coupled to pivot at golden section points that occur along the length of said blades and at the endpoints of said blades with additional said fasteners.

3. The device of claim 1, wherein the center of a circular protractor coincides with said fastener that couples the endpoints of said blades.

4. The device of claim 1, wherein said fasteners are eyelets.

5. The device of claim 4, wherein said eyelets occur at golden section points without being attached to said blades.

6. A method in accordance with claim 1 including the steps of:

adjusting said device in a manner whereby two eyelets coincide with two points of a subject;

transferring said device to a secondary surface;

marking the location of said eyelets;

repeating this process until placement and proportion of said loci are sufficient to manifest an accurate rendering of said subject.

7. A device for locating the positions of the golden section ratio comprising:

a plurality of paired segments, and a plurality of fasteners, whereby said fasteners hinge said segments, to pivot at points that coincide with the location of said segments'endpoints, and where golden section occurs along the length of said segments, whereby a looped series of connected levers are sequenced to diminish in length by a ratio that is consistent with the golden section, and said levers are coupled to pivot at golden section fulcrums.

8. The device of claim 7 wherein additional said segments are hinged to golden section points that occur along the length of said segments and at the endpoints of said segments with additional said fasteners.

9. The device of claim 7 wherein the center of a circular protractor is aligned with golden section points that occur at the endpoints of said segments and coupled to pivot by said fasteners.

10. The device of claim 7 wherein said fasteners are eyelets.

11. The device of claim 7 wherein said eyelets occur at golden section points without being attached to said segments.

* * * * *